US008538426B2

(12) United States Patent
Karaoguz et al.

(10) Patent No.: US 8,538,426 B2
(45) Date of Patent: *Sep. 17, 2013

(54) CONTROLLING AND ENHANCING HANDOFF BETWEEN WIRELESS ACCESS POINTS

(75) Inventors: Jeyhan Karaoguz, Irvine, CA (US); Nambi Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 13/231,379

(22) Filed: Sep. 13, 2011

(65) Prior Publication Data

US 2012/0077459 A1  Mar. 29, 2012

Related U.S. Application Data

(63) Continuation of application No. 12/149,657, filed on May 6, 2008, now Pat. No. 8,019,342, which is a continuation of application No. 11/247,323, filed on Oct. 12, 2005, now Pat. No. 7,386,296, which is a continuation of application No. 10/317,082, filed on Dec. 12, 2002, now Pat. No. 7,046,989.

(60) Provisional application No. 60/409,931, filed on Sep. 12, 2002.

(51) Int. Cl.
*H04W 4/00* (2009.01)
*H04W 40/00* (2009.01)

(52) U.S. Cl.
USPC .................. 455/435.1; 455/411; 455/439

(58) Field of Classification Search
USPC .......... 455/3.04, 405–408, 411, 414.1, 422.1, 455/426.1, 426.2, 432.2, 432.3, 435.1, 436, 455/444, 432.1, 439
See application file for complete search history.

(56) References Cited

U.S. PATENT DOCUMENTS

| 6,725,044 | B2 | 4/2004 | Verma et al. |
| 7,296,152 | B1 | 11/2007 | MacPherson et al. |
| 7,734,293 | B2 | 6/2010 | Zilliacus et al. |
| 7,738,488 | B2 | 6/2010 | Marsico et al. |
| 7,849,173 | B1 * | 12/2010 | Uhlik ............................ 709/223 |
| 2002/0191575 | A1 | 12/2002 | Kalavade et al. |
| 2003/0007464 | A1 | 1/2003 | Balani |
| 2003/0051041 | A1 | 3/2003 | Kalavade et al. |
| 2003/0235305 | A1 | 12/2003 | Hsu |

(Continued)

OTHER PUBLICATIONS

"IEEE 802.11, A Technical Overview," Pablo Brenner, BreezeNet website, Jul. 8, 1997, www.sss-mag.com/pdf/80211p.pdf.

(Continued)

*Primary Examiner* — Binh Tieu
(74) *Attorney, Agent, or Firm* — Garlick & Markison; Kevin L. Smith

(57) ABSTRACT

A wireless device includes at least one processor operable to transmit authentication information to one of a plurality of access devices associated with a first wireless hotspot; and establish an access session with the one of the plurality of access devices. Information related to the access session is saved in memory accessible by a plurality of wireless access providers. When the wireless device moves from a coverage area of the first wireless hotspot to a coverage area of the one of the plurality of wireless access providers, the saved information facilitates access to the one of the plurality of wireless access providers by the wireless device.

21 Claims, 8 Drawing Sheets

(56) References Cited

U.S. PATENT DOCUMENTS

| | | | |
|---|---|---|---|
| 2004/0128345 A1 | 7/2004 | Robinson et al. | |
| 2005/0097356 A1 | 5/2005 | Zilliacus et al. | |
| 2005/0256937 A1* | 11/2005 | Lewis | 709/217 |
| 2006/0291455 A1 | 12/2006 | Katz et al. | |
| 2007/0112948 A1* | 5/2007 | Uhlik | 709/223 |
| 2010/0184377 A1 | 7/2010 | Zilliacus et al. | |

OTHER PUBLICATIONS

Donny Jackson, Telephony, Ultrawideband May Thwart 802.11, Bluetooth Efforts, PRIMEDIA Business Magazines & Media Inc., Feb. 11, 2002.

Daniel L. Lough, et al., "A Short Tutorial on Wireless LANs and IEEE 802.11," The IEEE Computer Society's Student Newsletter, Virginia Polytechnic Institute and State University, Summer 1997, vol. 5, No. 2.

Dr. Robert J. Fontana, "A Brief History of UWB Communications," Multispectral.com, Multispectral Solutions, Inc., www.multispectral.com/history.html, Aug. 20, 2002.

Gerald F. Ross, "Early Motivations and History of Ultra Wideband Technology," Anro Engineering, Inc., Multispectral. com, Multispectral Solutions, Inc., www.multispectral.com/history.html, Aug. 20, 2002.

Dr. Terence W. Barrett, "History of Ultra Wideband (UWB) Radar & Communications: Pioneers and Innovators," Proceedings and Progress in Electromagnetics Symposium 2000 (PIERS2000), Cambridge, MA, Jul. 2000.

Dr. Henning F. Harmuth, "An Early History of Nonsinusoidal Electromagnetic Technologies," Multispectral.com, Multispectral Solutions, Inc., www.multispectral.com/history.html, Aug. 20, 2002.

Rebecca Taylor, "Hello, 802.11b and Bluetooth: Let's Not Be Stupid!", ImpartTech.com, www.ImportTech. com/802.11-bluebooth.htm, Aug. 21, 2002.

Matthew Peretz, "802.11, Bluetooth Will Co-Exist: Study," 802.11-Planet.com, INT Media Group, Inc., Oct. 30, 2001.

"Bluetooth and 802.11: A Tale of Two Technologies," 10Meters.com, www.10meters.com/blue_802.html, Dec. 2, 2000.

Keith Shaw, "Bluetooth and Wi-Fi: Friends or foes?", Network World Mobile Newsletter, Network World, Inc., Jun. 18, 2001.

Joel Conover, "Anatomy of IEEE 802.11b Wireless," NetworkComputing.com, Aug. 7, 2000.

Bob Brewin, "Intel, IBM Push for Public Wireless LAN," Computerworld.com, Computerworld Inc., Jul. 22, 2002.

Ernest Khoo, "A CNET tutorial: What is GPRS?", CNET Networks, inc., Feb. 7, 2002.

Les Freed, "Et Tu, Bluetooth?", ExtremeTech.com, Ziff David Media Inc., Jun. 25, 2001.

Bluetooth & 802.11 b—Part 1, www.wilcoxonwireless.com/whitel2a12erslbluetoothvs802.doc, Jan. 2002.

Bob Brewin, "Report: IBM, Intel, Cell Companies Eye National Wi-Fi Net," Computerworld.com, Computerworld Inc., Jul. 16, 2002.

Bob Brewin, "Microsoft Plans Foray Into Home WLAN Device Market," Computerworld.com, Computerworld Inc., Jul. 22, 2002.

Bob Brewin, "Vendors Field New Wireless LAN Security Products," Computerworld.com, Computerworld Inc., Jul. 22, 2002.

Jeff Tyson,"How Wireless Networking Works," Howstuffworks.com, Howstuffworks, Inc., www.howstuffworks.com/wireless-network.htm/l2rintable. Aug. 15, 2002.

Curt Franklin, "How Bluetooth Works," Howstuffworks.com, Howstuffworks, Inc., www.howstuffworks.comlbluetooth.htm/printable, Aug. 15, 2002.

802. llb Networking News, News for Aug. 19, 2002 through 8/1112002, 80211b.weblogger.com/, Aug. 11-19, 2002.

"Wireless Ethernet Networking with 802.11 b, An Overview," HomeNetHelp.com, Anomaly, Inc., www.homenethell2.com/80211.b/index.asl2, Aug. 20,2002.

"Simple 802.11 b Wireless Ethernet Network with an Access Point," HomeNetHelp.com, Anomaly, Inc., www.homenetheIQ.comlweb/diagramlaccess-QointasQ, Aug. 20, 2002.

"Simple 802.11 b Wireless Ethernet Network without an Access Point," HomeNetHelp.com, Anomaly, Inc., www.homenetheIQ.cornlweb/diagramlad-hoc.asQ, Aug. 20, 2002.

"Cable/DSL Router with Wired and Wireless Ethernet Built In," HomeNetHelp.com, Anomaly, Inc., www.homenetheIQ.comlweb/diagramlshare-router-wireless.asl2, Aug. 20, 2002.

"Bridging a Wireless 802.11 b Network with a Wired Ethernet Network" HomeNetHelp.com, Anomaly, Inc., www.homenethell2.comlweb/diagramlwireless-bridged.as12, Aug. 20, 2002.

"Wireless Access Point (802.llb) of the Router Variety," HomeNetHelp.com, Anomaly, Inc., www.homenetheIQ.comlweb/diagramIshare-wireless-aQ.asQ, Aug. 20,2002.

Robert Poe, "Super-Max-Extra-Ultra-Wideband!", Business2.com, Oct. 10, 2000.

David G. Leeper, "Wireless Data Blaster," ScientificAmerican.com, Scientific American, Inc., May 4, 2002.

Steven J. Vaughan-Nichols, "Ultrawideband Wants to Rule Wireless Networking," TechUpdate.ZDNet.com, Oct. 30,2001.

Jim Zyren and Al Petrick, "Brief Tutorial on IEEE 802.11 Wireless LANs," AN9829, Intersil Corporation, Feb. 1999.

"Overview of UWB?", PulseLink.net, Pulse-Link, Inc., www.Qulselink.netiov histo~.html, Sep. 4, 2002.

Robert X. Cringely, "The 100 Mile-Per-Gallon Carburetor—How Ultra Wide Band May (or May Not) Change the World," InterestingPeople.org, Jan. 26,2002.

William A. Kissick, Editor, "The Temporal and Spectral Characteristics of Ultra wide band Signals," NTIA Report 01-383, Jan. 2001, www.its.bldrdoogov/pub/ntia-rpt/01-383/.

"Ultra Wide Band," www.ida.gov.sg/Website/IDAContent.nsf/dd1521fle79ecf3bc825682f0045a349/1856626048baf4 03c8256988026 7e26%3FOpenDocument+%Full+duplex+Uwb+handheldtransceiver%22&hl=en&ie=UTF-8, Aug. 20, 2002.

* cited by examiner

| Level of Authorization | Prompting Mode for User |
|---|---|
| Enterprise-wide | No Prompting of User |
| Change in type of coverage | Prompt user for information on change in type of coverage |
| Street-level coverage | Prompt for information on every hand-off |

CONTROLLING AND ENHANCING HANDOFF BETWEEN WIRELESS ACCESS POINTS

REFERENCE TO RELATED APPLICATIONS

The present application is a continuation of U.S. application Ser. No. 12/149,657, filed May 6, 2008, now U.S. Pat. No. 8,019,342, issued Sep. 13, 2011, which is a continuation of U.S. application Ser. No. 11/247,323, filed Oct. 12, 2005, now U.S. Pat. No. 7,386,296, issued Jun. 10, 2008, which in turn is a continuation of U.S. application Ser. No. 10/317,082, filed Dec. 12, 2002, now U.S. Pat. No. 7,046,989, issued May 16, 2006, which in turn is an application claiming priority of U.S. Provisional Patent Application No. 60/409,931, filed on Sep. 12, 2002, now expired. The subject matter of these earlier filed applications is hereby incorporated by reference.

BACKGROUND OF THE INVENTION

1. Field of Invention

The present invention relates to devices and networks that utilize wireless networks and methods of maintaining access to a portable device when the portable device passes from one access area to another access area for the wireless network. The present invention further relates to methods, devices and networks that allow for wireless portable devices to pass from one hotspot to another and have access information be utilized by both hotspots. Additionally, the present invention also provides a way for the wireless portable devices to pass out of the coverage area of a wireless hotspot and return without having to reauthorize the access of the wireless portable device.

2. Description of Related Art

The emergence of what are commonly called wireless hotspots has increased the mobility of wireless users and allowed mobile users to access network resources without requiring a physical connection to a main network. Many of these wireless hotspots have appeared in several areas, including coffee shops and libraries, and allow users with wireless communication equipment to communicate with local area networks and wide area networks as they move around. These locations that provide the access do so to attract customers or, in the case of public libraries, because they see such access as an extension of their function to serve the public interest. Many of the wireless devices that can access the wireless hotspots can also wirelessly connect to other networks. One format for cellular networks is the General Packet Radio Service (GPRS), a standard for wireless communication that runs at speeds up to 115 kbits per second, which can be compared with Global System for Mobile Communications (GSM) systems having 9.6 kilobit per second speed.

Difficulties can occur when a wireless device passes out of the coverage range of an access point of a hotspot. The device can pass into the coverage range of another hotspot, pass into a coverage area supporting only cellular service or even passing into an area having no wireless coverage. These difficulties can include the difficulty in downloading data when the process is begun in one coverage area and continues in a different coverage area. Another difficulty occurs when a wireless device passes outside the coverage area for a short period and the user must log back onto the hotspot, an often tedious task. Both difficulties can be acute when the wireless data service being provided depends on a high quality of service, such as videoconferencing.

As such, there is a need for a method or mechanism that can create and maintain access of wireless portable devices to wireless hotspots when the locations of the wireless portable devices change. In addition, there is also a need for systems and methods that maintain information about the access of a wireless portable device when the wireless portable device passes to an access area of another wireless hotspot.

SUMMARY OF THE INVENTION

It is an object of this invention to overcome the drawbacks of the above-described conventional network devices and methods. The present invention is directed to methods and mechanisms that can create and maintain access of wireless portable devices to wireless hotspots when the locations of the wireless portable devices change. In addition, The present invention is directed to systems and methods that maintain information about the access of a wireless portable device when the wireless portable device passes to an access area of another wireless hotspot According to one aspect of this invention, a process of maintaining access information between wireless hotspots is disclosed. A logon request from a wireless portable device is received by a first access point of a first wireless hotspot and use of the first access point by the wireless portable device is authenticated to establish an access session. Then, information related to the access session is passed to a shared register accessible by a plurality of wireless access providers and the access session is monitored to determine whether a disconnect by the wireless portable device occurs. Additionally, when the wireless portable device moves from a coverage area of the first wireless hotspot to one coverage area of one of the plurality of wireless access providers, the information related to the access session may be used to facilitate access to the one of the plurality of wireless hotspots by the wireless portable device.

Alternatively, information related to the access session may be passed to both a shared register accessible by a plurality of wireless access providers and to a local register of the first access point. Also, the access session may be reinitiated when the wireless portable device re-associates with the first access point of the first wireless hotspot. The re-initiation may also involve prompting the wireless portable device for authorization data based on a level of authorization between the plurality of wireless access providers. Additionally, information related to the access session may be purged from the shared register after a predetermined time after the disconnect by the wireless portable device is detected.

The process may include, after the disconnect by the wireless portable device is detected, determining whether the wireless portable device has passed into the one coverage area of one of the plurality of wireless access providers, encapsulating packets, received by the first access point destined for the wireless portable device, with forwarding information for another access point for the one coverage area and forwarding the encapsulated packets to the another access point for the one coverage area. The authenticating process may include: requesting a public key and an identifier for the wireless portable device, receiving the public key and the identifier for the wireless portable device, authenticating the public key and identifier for access to the first wireless hotspot, and requesting login and password data to establish the access session between the first wireless hotspot and the wireless portable device. The identifier may be a wireless telephone number and billing authorization may be requested for the wireless telephone number from a wireless telephone service provider.

According to another embodiment of the invention, a process of maintaining access information between wireless hotspots is disclosed. The process includes monitoring movements of a wireless portable device logged onto a first access point of a first wireless hotspot within a first coverage area for the first wireless hotspot; determining when the wireless portable device is passing from the first coverage area, transferring access session information associated an access session between the first access point and the wireless portable device to a controller for a new coverage area, into which the wireless portable device is entering and establishing a new access session for a new wireless portable device entering the first coverage area when new access session information associated the new wireless portable device is received. Wherein the establishing step does not require a new authentication of the new wireless portable device.

According to another embodiment of the invention, a system for maintaining access information between wireless hotspots is disclosed. The system includes receiving means for receiving a logon request from a wireless portable device by a first access point of a first wireless hotspot and authenticating means for authenticating use of the first access point by the wireless portable device to establish an access session. The system also includes passing means for passing information related to the access session to a shared register accessible by a plurality of wireless access providers and monitoring means for monitoring the access session to determine whether a disconnect by the wireless portable device occurs. Additionally, when the wireless portable device moves from a coverage area of the first wireless hotspot to one coverage area of one of the plurality of wireless hotspots, the information related to the access session may be used to facilitate access to the one of the plurality of wireless hotspots by the wireless portable device.

In another embodiment, a system for maintaining access information between wireless hotspots is disclosed. The system includes a receiver, for receiving a logon request from a wireless portable device by a first access point of a first wireless hotspot and an authenticator, for authenticating use of the first access point by the wireless portable device to establish an access session. The system also includes a register writer, for passing information related to the access session to a shared register accessible by a plurality of wireless hotspots and a monitor, for monitoring the access session to determine whether a disconnect by the wireless portable device occurs. Additionally, when the wireless portable device moves from a coverage area of the first wireless hotspot to one coverage area of one of the plurality of wireless hotspots, the information related to the access session may be used to facilitate access to the one of the plurality of wireless hotspots by the wireless portable device.

These and other objects of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures.

DETAILED DESCRIPTION OF PREFERRED EMBODIMENTS

The present invention is directed to method and systems for controlling and enhancing the handoff between access points of hotspots or the handoff from one type of wireless service to another type of wireless service. The present invention is directed to processes that allow for continuity of data transmission and reduces the inconvenience to the user from roaming between different access points.

Figure 1:
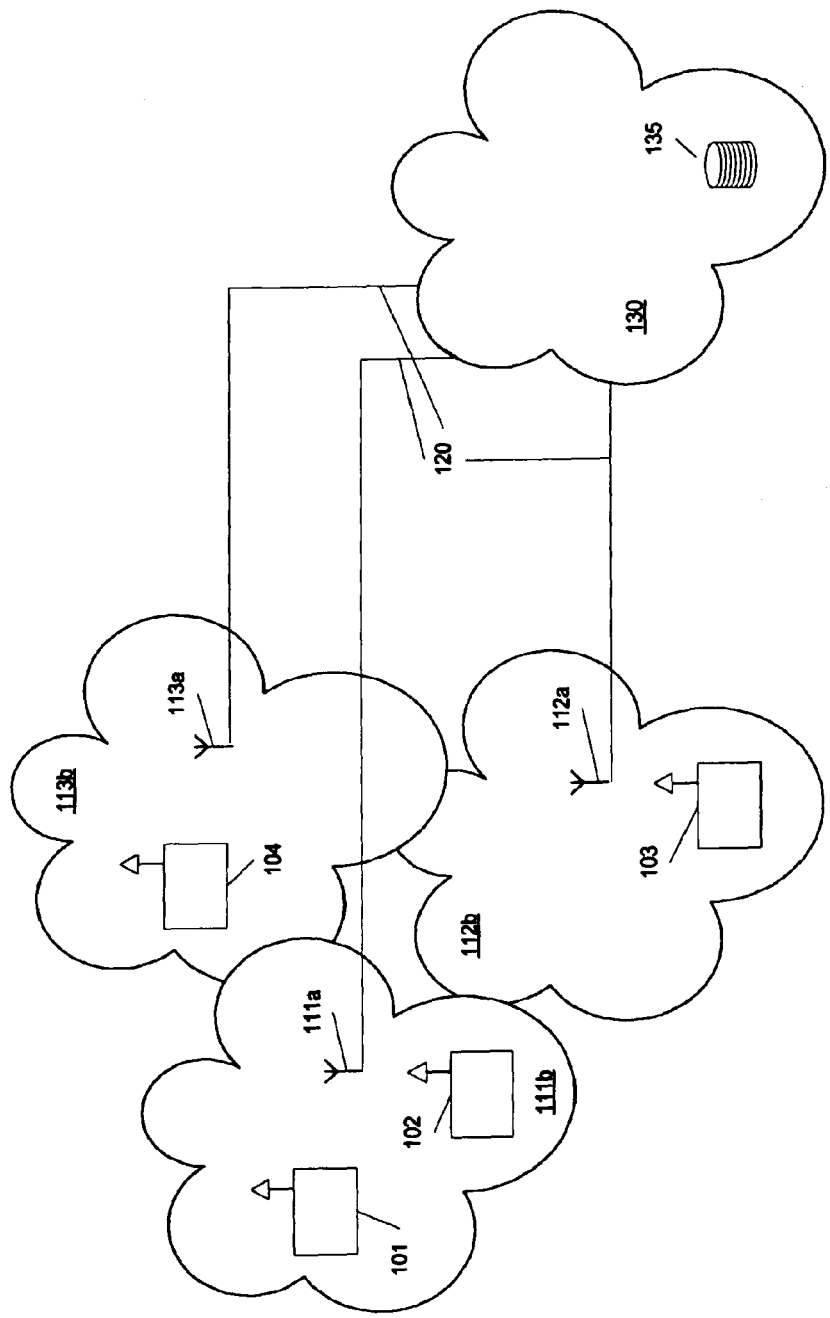
FIG. 1 is a schematic representation of a wireless telephone system having multiple cells, according to one embodiment of the present invention.

A general cellular telephone network is illustrated in FIG. 1. Multiple cells 111*b*, 112*b* and 113*b* are established through the use of antennas 111*a*, 112*a* and 113*a*. Devices 101-104 having access to the cellular telephone network are able to move from cell to cell and maintain communication with the network. Each antenna 111*a*-113*a* is connected, through a connection link 120, with a service provider 130. The service provider 130 controls access to the network and coordinates the handing-off of access as the devices pass between the cells. The service provider can identify each device and can route communication to the proper location of the particular device. Commonly, the devices 101-104 may be cellular telephones, computers with wireless modems and other devices that exchange information with the service provider.

Figure 2:
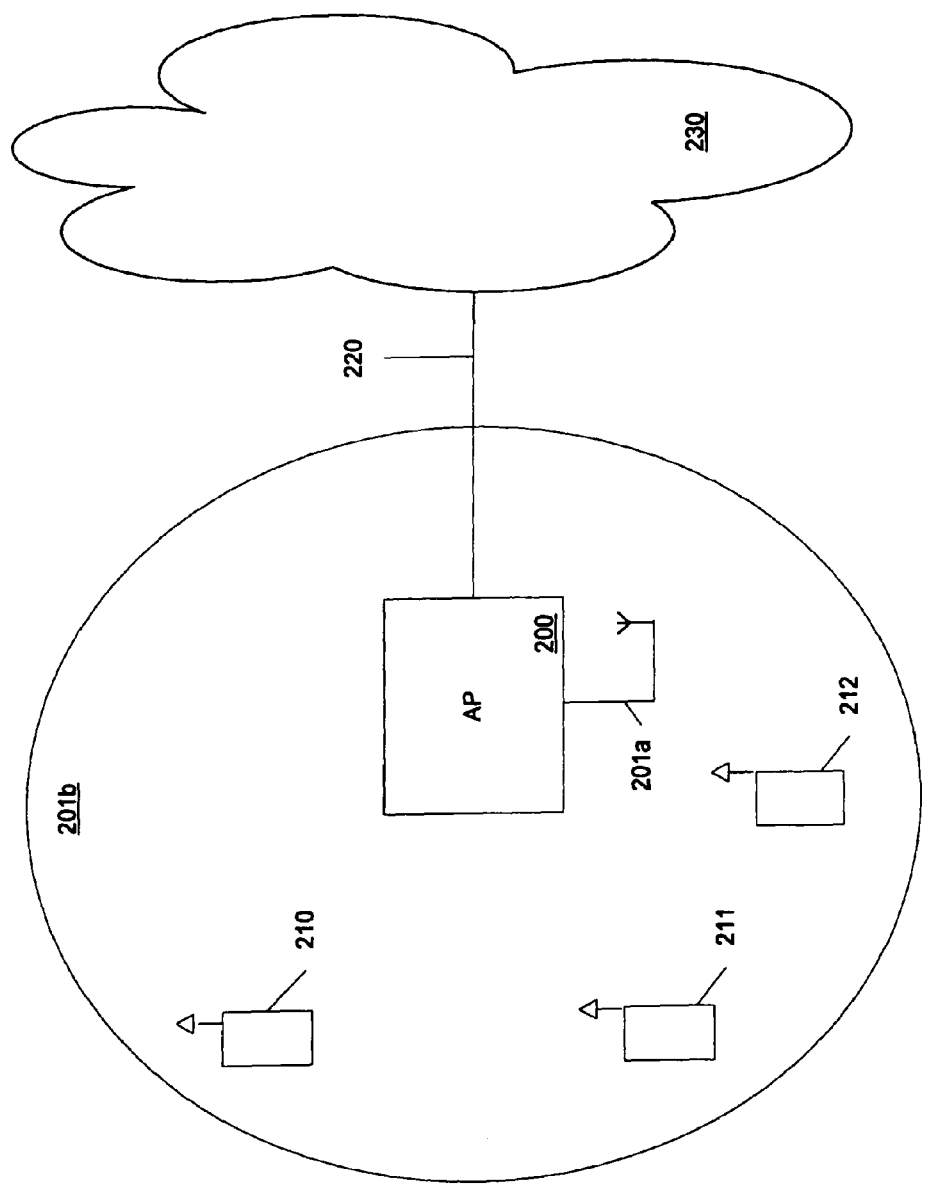
FIG. 2 illustrates a schematic representation of a wireless hotspot with an access point and several wireless devices, according to one embodiment of the present invention.

An example of a general wireless hotspot installation is illustrated in FIG. 2. The hotspot can be controlled through an access point 200, with the access point having an antenna 201*a* to establish a wireless access zone 201*b*. The wireless access may be made through an IEEE 802.11 standard local area network (LAN) or other type of wireless network. Devices 210-212 within the hotspot are able to communicate with the larger network 230 through communication with the access point 200. The access point 200 has a communication link 220 with the larger network 230 and the access point acts to enable communication between the devices 210-212 and the larger network and between the devices themselves. As examples, the devices 210-212 may be computers equipped with 802.11 access cards, personal digital assistants enabled for wireless access and cellular telephones having multiple means for wireless access. The larger network, for example, may be the Internet or some private wide area network.

Figure 3:
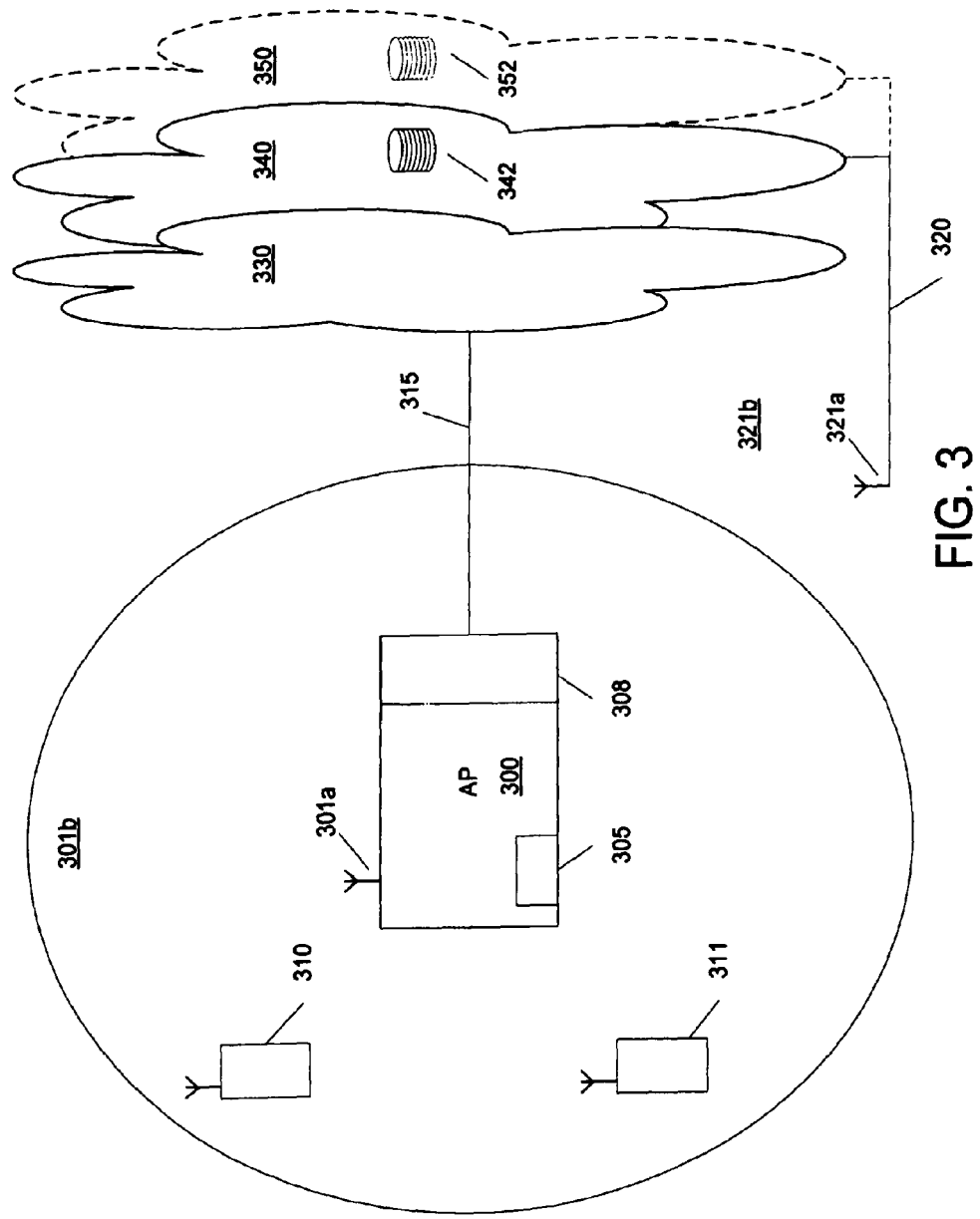
FIG. 3 illustrates a schematic of a wireless hotspot with connections to different network entities, according to an embodiment of the present invention.

FIG. 3 illustrates one embodiment of the present invention. A wireless hotspot is illustrated, with the coverage of the hotspot set by the access point 300 through an antenna 301a, the range of the hotspot is illustrated by the range 301b. Devices 310 and 311 within the range 301b may potentially establish a connection with the hotspot. The access to the access point is controlled through the access controller 305, that may be hardware, firmware, software or a combination thereof. A communication connection 315 is established between the access point 300 and the larger network 330 where that connection is modulated by a router 308.

Also illustrated in FIG. 3 is a wireless telephone service provider 340. The service provider 340 contains a database 342 of users of the wireless telephone network. The wireless telephone service provider could provide services through an antenna 321a, through a connection 320, to provide a coverage area 321b. The coverage area 321b for the wireless telephone service may also include some or all of the wireless hotspot range 301b.

In another embodiment of the present invention, a third party could act as an agent for the service provider and would create the incentive for establishing the hotspot locations. In this embodiment, the service provider, such as a wireless telephone provider 350 would have account information for the user in its database 352. The third party 340 could act as a go-between and would maintain its own records of users in its own database 342. The benefit of the third party in this embodiment of the present invention is that the third party would provide the interface between the wireless hotspot and the service provider and would not require any direct interaction between the service provider and the wireless hotspot. Another benefit of the third party embodiment is that users could supply account data for accounts they have with entities other than the wireless telephone service provider, such as a television cable company or an Internet service provider.

Figure 4:
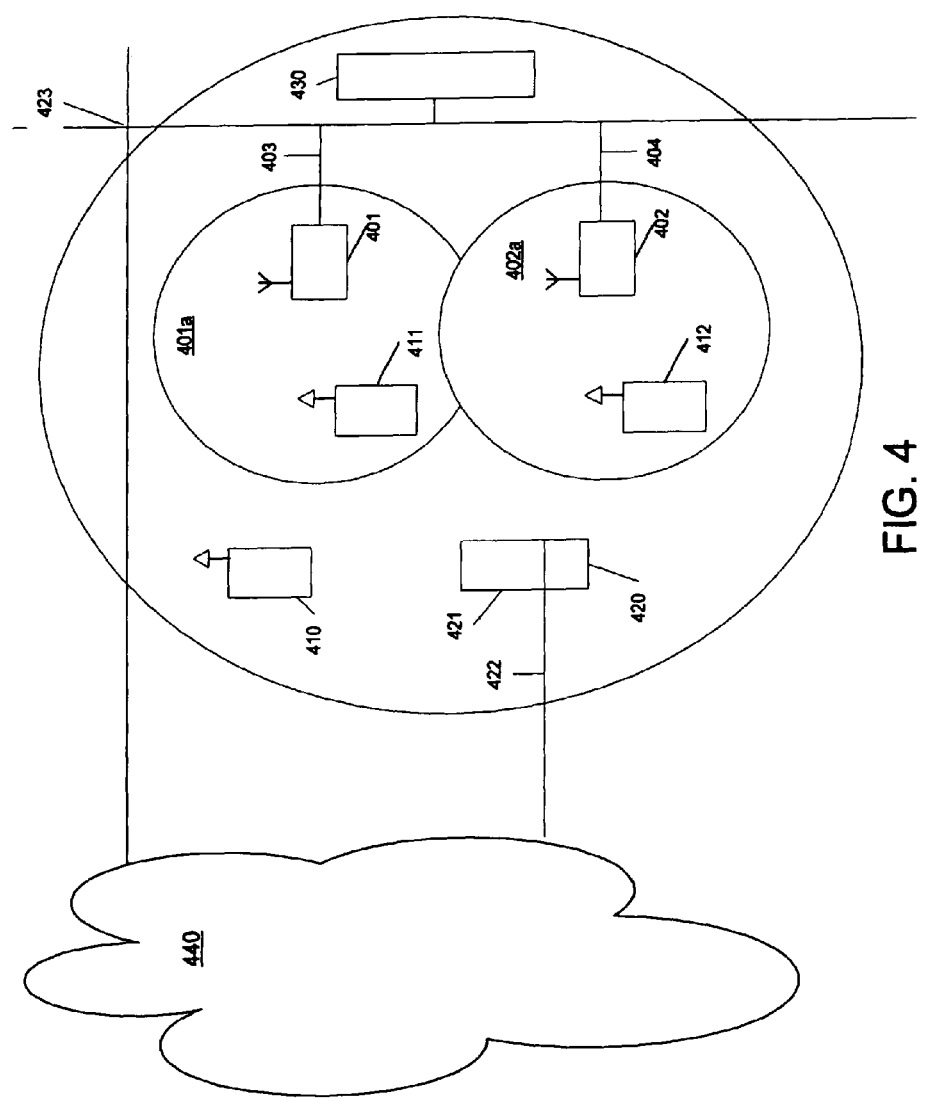
FIG. 4 provides a schematic representations of several wireless hotspot area within a coverage area for a wireless telephone service provider, according to one embodiment of the present invention.

An illustration of an environment having multiple hotspots within a cellular network is provided in FIG. 4. Two access points 401 and 402 provide overlapping coverage area 401a and 402a. The wireless devices 411 and 412 within those coverage areas can have access to the Internet through a wireless connection to the access points. Both access points 401 and 402 have connections 403 and 404 to an Internet backbone. The wireless device 410 outside the hotspot coverage areas can still have access to the larger network through exchange of data through the cellular coverage area 421a. The coverage area for the cellular network is defined by a cellular base station 421 connected to the cellular service provider 440. Also part of the cellular network are registers containing data about users of the cellular network, namely the home location register 420 and the visitor location register 430. Both registers can be used to set up calls on the cellular network and maintain data about the call, including the generation of detailed billing records. The present invention is concerned with handling and control of the handoff from a wireless device that passes between the different coverage areas.

Figure 5:
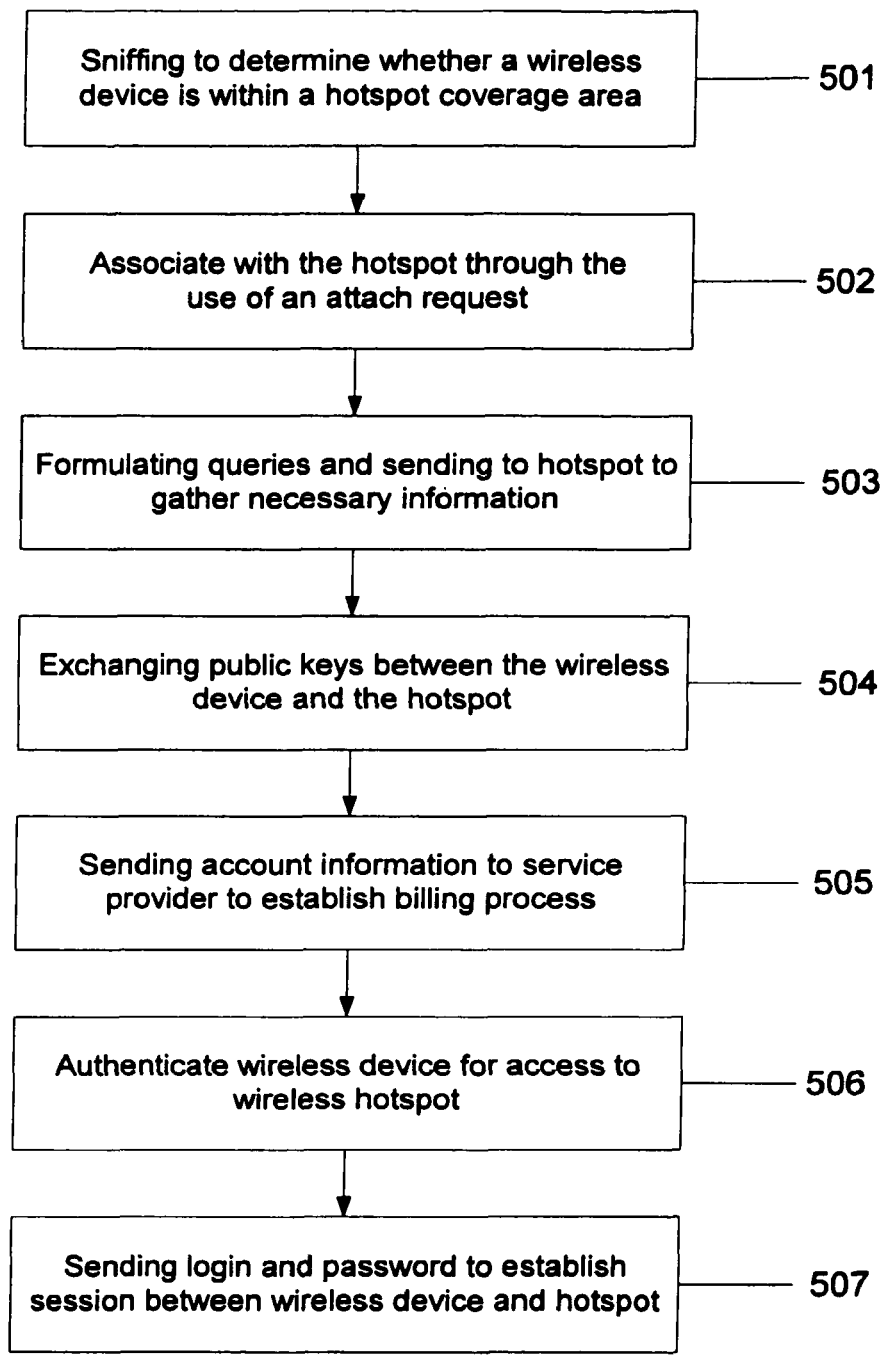
FIG. 5 illustrates a flowchart of the process of establishing access to a wireless hotspot, according to one embodiment of the present invention.

FIG. 5 provides a general flowchart of an example of the login process for a wireless device on a hotspot according to one embodiment of the present invention. First, the wireless device searches or sniffs to determine whether the device is within the hotspot coverage area, in step 501. If the hotspot is detected, the wireless device attempts to associate itself with the hotspot through the use of an attach request, in step 502. Queries are formulated and sent to the hotspot to gather necessary information, in step 503.

Thereafter, public keys or other information are exchanged between the wireless device and the hotspot, in step 504 and account information is sent to a service provider to establish the billing process, in step 505. In general, the wireless device initially sends and identifier and a public key to the wireless hotspot. The wireless hotspot utilizes the connection with a trusted party, such as the wireless telephone service provider, to verify whether the identifier and public key are correct. The identifier may be a wireless telephone number to provide proper authorization. The wireless hotspot may issue a challenge to the wireless device to seek further verification. The issuing of a challenge may be performed instead of seeking confirmation of authorization data from the trusted party. Additionally, the wireless device may send a public key certificate, which is temporary, and thereafter use symmetric, exchanged keys to ensure proper encryption of data transferred between the wireless device and the wireless hotspot.

Returning to FIG. 5, the wireless device is authenticated for access to the wireless hotspot, in step 506, and login and password data is sent to the hotspot to establish a session, in step 507. As is illustrated in FIG. 5, the login and authentication process may require responses from the user based on prompts sent from the hotspot. This further illustrates the benefits of an efficient handoff between coverage ranges if the log in and authentication process need not be repeated.

Figures 6, 8:
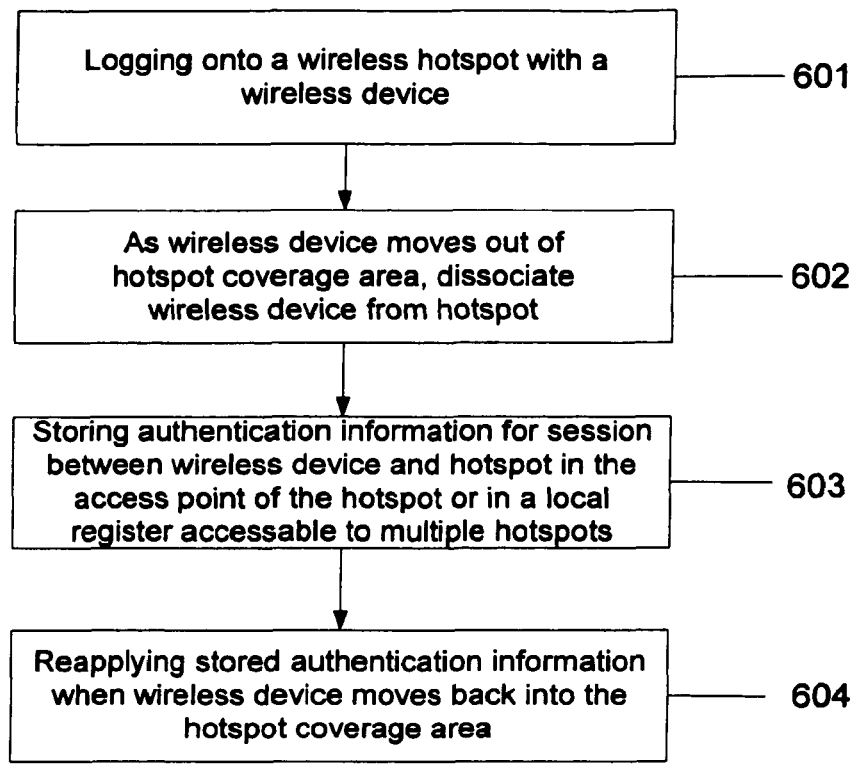
FIG. 6 illustrates a flowchart of the process of maintaining authorization data between wireless hotspots, according to an embodiment of the present invention.
FIG. 8 illustrates levels of authorization and the corresponding prompting of a user, according to one embodiment of this invention.

An example of a process of controlling and enhancing the handoff between access points is illustrated in FIG. 6. Initially, a wireless device logs into a wireless hotspot, in step 601. As the wireless device moves out of the hotspot coverage area, the access of the wireless device with the hotspot is dissociated, in step 602. The authentication information for the prior session is stored in the access point of the hotspot or in a local register accessible to multiple hotspots, in step 603. A common register that may be used to store the authentication data may be the visitor location register, discussed above. Once the wireless device moves back into the coverage area for the hotspot, the authorization information is re-applied and the session recommences, in step 604. The process of re-applying the information occurs at the associating step and the other steps of the log in and authentication process need not be repeated. Usually, the authorization information in maintained for a period of time and can be purged at an appropriate time, such as when the register is updated.

Figure 7:
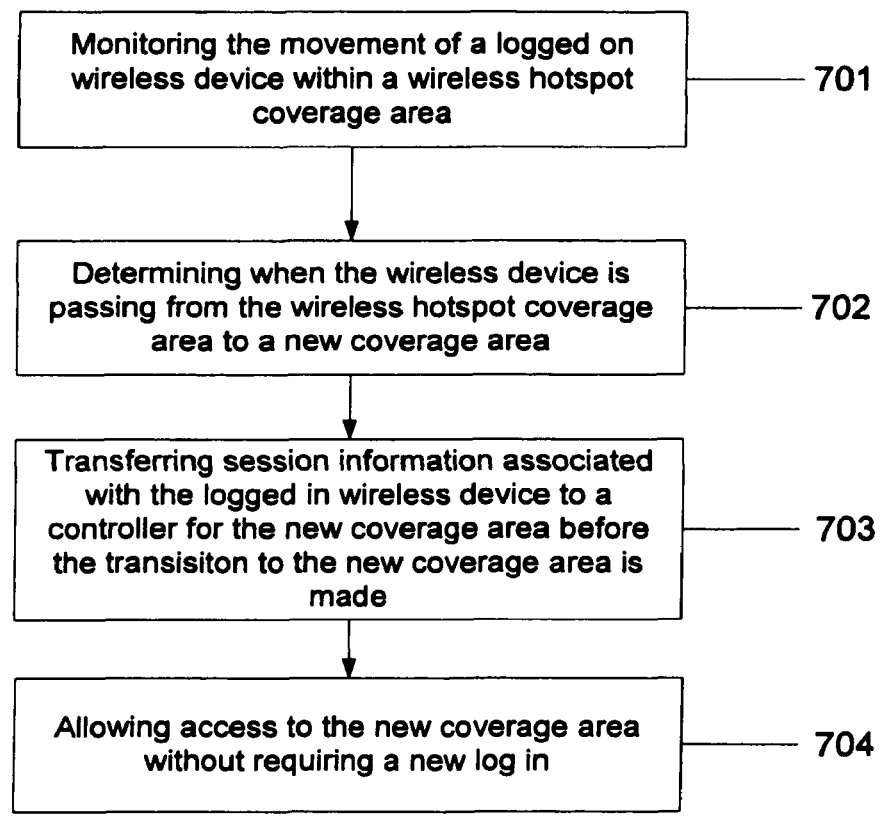
FIG. 7 illustrates a flowchart of the process of maintaining access data between wireless hotspots, according to one embodiment of this invention.

Another embodiment of the present invention, illustrated in FIG. 7, is directed to transferring data for the handoff before the transition to another coverage area occurs. The movement of a logged on wireless device is monitored within the wireless hotspot coverage area, in step 701. Once it is determined that the wireless device is passing from the wireless hotspot coverage area to new coverage area, in step 702, the session information is transferred to a controller of the new coverage area before the transition to the new coverage area is made, in step 703. Once the wireless device is in the new coverage area, no new log in is required because the prior authentication information for the prior session has been transferred, in step 704.

In addition to method for securing the handoff of authorization information between coverage areas, the present invention also provides for differing authorization levels that require different levels of prompting of the user, as illustrated in FIG. 8. An enterprise-wide level of authorization, a user can pass from coverage area to coverage area within the enterprise and not need to enter additional information. A change in the type of coverage level of authorization requires input from the user. Such a change could occur when the wireless device switches from an IEEE 802.11 wireless network to a GPRS network where the data rate drops and the user would be queried to determine if access is to be maintained. With a street-level coverage, such as between several public wireless hotspots, a prompt is made for information for every handoff between coverage areas.

Figure 9:
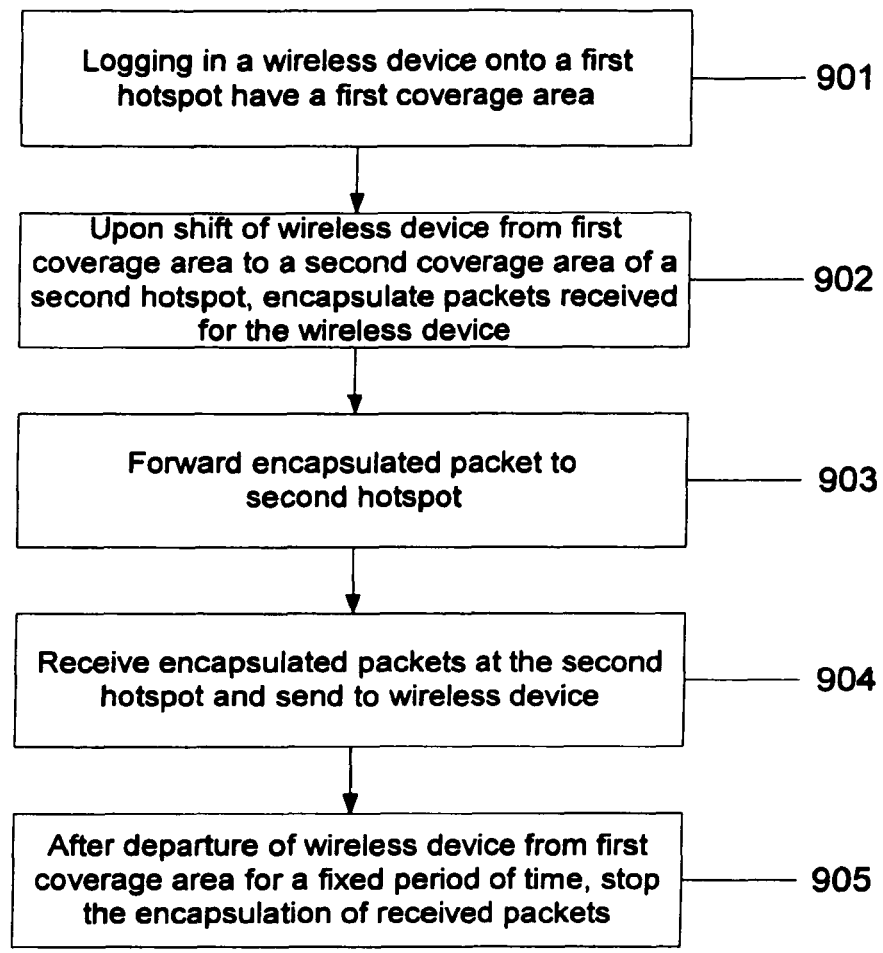
FIG. 9 illustrates a flowchart of the process of maintaining access data between wireless hotspots through internet protocol persistance, according to one embodiment of this invention.

According to another embodiment, data received at one access point of a hotspot can encapsulate packet data received for a wireless device that has moved to a different coverage area. Such encapsulation would be temporary after the wireless device moves to the new coverage area and would be important for application that requires a high degree of data integrity. The process is illustrated in FIG. 9. A wireless device logs onto a first hotspot having a first coverage area, in step 901. When the wireless device shifts from the first coverage area to a second coverage area of a second hotspot, the first access point, controlling the first hotspot, encapsulates packets received that are destined for the wireless device, in step 902. The encapsulated packets are forwarded to the second hotspot, in step 903. The received encapsulated packets are received by the second hotspot and are sent to the wireless device, in step 904. After departure of the wireless device from the first coverage area for a fixed period of time, the encapsulation process is stopped, in step 905. It is assumed that after the fixed period of time, the new routing of packets to the second hotspot could be achieved and the encapsulation of packets to achieve the proper routing may be stopped.

The methods and systems of the present invention provide for control and enhancement of the handoff process between access points of hotspots or the handoff from one type of wireless service to another type of wireless service. The present invention also allows for continuity of data transmission and reduces the inconvenience to the user from roaming between different access points.

It is noted that the present application is directed, at least in part, to wireless hotspots. The use of the term wireless hotspot or hotspot is applicable to any wireless access point. The term wireless hotspot or hotspot, as used in the specification and claims, should not be construed to be limited to a single type of locale or be construed as providing access according to only a particular wireless access format, such as the IEEE 802.11 standard. It would also be within the scope of the invention to implement the disclosed elements of the invention in discrete electronic components, thereby taking advantage of the functional aspects of the invention. Additionally, the present invention can be implemented totally or partially through software.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A wireless device, comprising:
    at least one processor operable to:
    transmit authentication information to one of a plurality of access devices associated with a first wireless hotspot; and
    establish an access session with said one of said plurality of access devices, wherein:
        information related to said access session is saved in memory accessible by a plurality of wireless access providers, and
        when the wireless device moves from a coverage area of said first wireless hotspot to a coverage area of one of said plurality of wireless access providers, said saved information facilitates access to said one of said plurality of wireless access providers by the wireless device.

2. The wireless device of claim 1, wherein said plurality of network devices access devices comprises a plurality of access points.

3. The wireless device of claim 1, wherein said access session is established upon authentication of the wireless device.

4. The wireless device of claim 1, wherein the wireless device is authenticated based on said authentication information.

5. The wireless device of claim 1, wherein said memory comprises a shared memory register.

6. The wireless device of claim 1, wherein said information related to said access session is purged from said memory after a predetermined time after a disconnect by the wireless device is detected.

7. The wireless device of claim 1, wherein in order to be authenticated, the wireless device is configured to transmit a public key and an identifier to said one of said plurality of access devices.

8. The wireless device of claim 7, wherein the wireless device is configured to transmit login and password data to establish said access session with said first wireless hotspot.

9. The wireless device of claim 8, wherein said public key and a wireless telephone number of the wireless device are authenticated by requesting billing authorization for said wireless telephone number from a wireless telephone service provider.

10. A method for communicating information in a wireless network, the method comprising:
    transmitting, by a wireless device, authentication information to one of a plurality of access devices associated with a first wireless hotspot; and
    establishing an access session with said one of said plurality of access devices, wherein:
        information related to said access session is saved in memory accessible by a plurality of wireless access providers, and
        when said wireless device moves from a coverage area of said first wireless hotspot to a coverage area of one of said plurality of wireless access providers, said saved information facilitates access to said one of said plurality of wireless access providers by said wireless device.

11. The method of claim 10, wherein said plurality of access devices comprises a plurality of access points.

12. The method of claim 10, wherein said access session is established upon authentication of said wireless device.

13. The method of claim 10, comprising authenticating said wireless device based on said authentication information.

14. The method of claim 10, wherein said memory comprises a shared memory register.

15. The method of claim 10, comprising purging said information related to said access session from said memory, after a predetermined time after a disconnect by said wireless device is detected.

16. The method of claim 10, comprising configuring said wireless device to transmit a public key and an identifier to said one of said plurality of access devices for authenticating said wireless device.

17. The method of claim 16, comprising configuring said wireless device to transmit login and password data to establish said access session with said first wireless hotspot.

18. The method of claim 17, comprising authenticating said public key and a wireless telephone number of said wireless device, by requesting billing authorization for said wireless telephone number from a wireless telephone service provider.

19. A wireless device, comprising:
at least one processor operable to:
transmit authentication information to one of a plurality of access devices associated with a first wireless hotspot; and
establish an access session with said one of said plurality of access devices, wherein:
information related to said access session is saved in local memory of said one of said plurality of access devices, and
when the wireless device leaves a coverage area of said first wireless hotspot and then re-associates with said one of said plurality of access devices, said access session is re-initiated, based on said information saved in said local memory.

20. The wireless device of claim 19, wherein said at least one processor is configured to transmit authorization data, based on a level of authorization between a plurality of wireless access providers, in order to re-initiate said access session.

21. The wireless device of claim 19, wherein said re-initiation of said access session does not require a new authentication of the wireless device.

* * * * *

UNITED STATES PATENT AND TRADEMARK OFFICE
CERTIFICATE OF CORRECTION

PATENT NO.       : 8,538,426 B2                           Page 1 of 1
APPLICATION NO.  : 13/231379
DATED            : September 17, 2013
INVENTOR(S)      : Karaoguz et al.

It is certified that error appears in the above-identified patent and that said Letters Patent is hereby corrected as shown below:

In the Claims

Col. 8, line 2, in claim 2: delete "network devices"

Signed and Sealed this
Twenty-fifth Day of November, 2014

Michelle K. Lee
*Deputy Director of the United States Patent and Trademark Office*